United States Patent [19]

Christopher

[11] Patent Number: 4,682,625
[45] Date of Patent: Jul. 28, 1987

[54] SPRINGLOADED SHUTOFF VALVE APPARATUS

[76] Inventor: Gilman G. Christopher, 924 W. 11th Pl., Mesa, Ariz. 85201

[21] Appl. No.: 892,327

[22] Filed: Aug. 4, 1986

[51] Int. Cl.$^4$ ............................................. F16K 15/02
[52] U.S. Cl. .............................. 137/538; 137/533.25; 137/542; 137/543.23
[58] Field of Search .................. 137/533.25, 538, 540, 137/542, 543.23

[56] References Cited

U.S. PATENT DOCUMENTS

| 2,670,922 | 3/1954 | Carlisle | 137/540 |
| 2,886,058 | 5/1959 | Horton | 137/542 X |
| 2,960,998 | 11/1960 | Sinker | 137/542 |
| 2,977,980 | 4/1961 | Scholin | 137/538 |

FOREIGN PATENT DOCUMENTS 2410343 9/1975 Fed. Rep. of Germany ...... 137/542

Primary Examiner—Robert G. Nilson
Attorney, Agent, or Firm—H. Gordon Shields

[57] ABSTRACT

Shutoff valve apparatus includes a spring-loaded piston with two guide portions disposed in bores and the piston includes a fluid passage extending through the piston and communicating with one of the bores in which a guide element is disposed. Any back pressure works with the bias of the spring to help seat the valve piston to prevent fluid from leaking past the valve. Positive pressure from the working fluid opens the valve.

7 Claims, 6 Drawing Figures

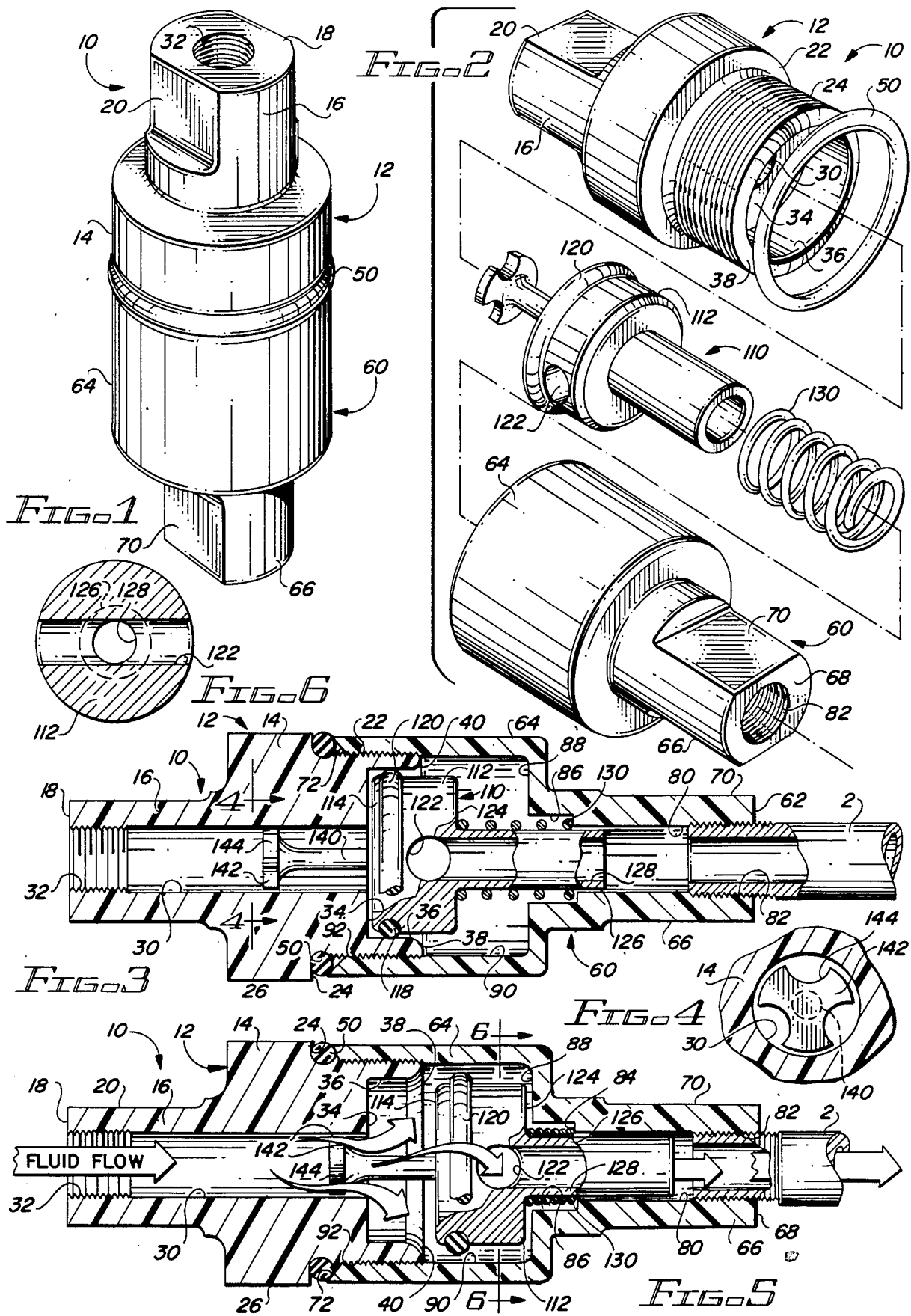

SPRINGLOADED SHUTOFF VALVE APPARATUS

BACKGROUND OF THE INVENTION

1. Field of the Invention:

This invention relates to valve apparatus, and, more particularly, to shutoff valve apparatus in which a piston is movable in a bore and the piston is spring-biased to a closed position and the piston includes a passage through which fluid flows.

2. Description of the Prior Art:

U.S. Pat. No. 455,853 (Shepard) discloses a pressure relief valve in which a spring-biased piston includes a plurality of apertures extending through a piston skirt. As pressure against the piston increases beyond a predetermind level, according to the rate of the springs, the piston moves and the apertures in its skirt allow pressure to be vented.

U.S. Pat. No. 2,731,981 (Glasser) discloses a pressure relief valve using a spring-biased piston. The piston includes a conically tapered surface, and there is a matching conically tapered valve seat. The piston includes passages extending through the piston. When pressure increases above a predetermined level, the valve opens and pressure is vented through the piston passages.

U.S. Pat. No. 2,886,058 (Horton) discloses two embodiments of check valves. Both embodiments utilize spring-biased pistons with spherical heads. The spherical heads extend into mating seats. Adjacent to the spherical heads there are a plurality of passages extending through the pistons. Both pistons work on the same principle. As excess pressure builds against the spherical heads, the pistons move, and pressure is vented through the passages.

U.S. Pat. No. 2,977,980 (Scholin) discloses a rather complicated valve for a metering pump. The apparatus includes a movable valve stem and a cavity which receives the valve stem and which holds a predetermined amount of fluid. As the valve stem moves into the cavity, the fluid is forced against a check valve which in turn moves under the hydraulic force to allow the predetermined volume of fluid to flow out of the apparatus. Back pressure against the check valve causes the check valve to move to prevent further flow. The check valve includes two separate passage systems, one through which the initial fluid flows, and a second through which the fluid flows out of the check valve. Two different types of pressure are used to help seat the check valve. One type of spring pressure is from a helically configured spring, and the second type of spring pressure is from a resilient, cylindrical sleeve.

U.S. Pat. No. 3,943,969 (Rubin et al) discloses a check valve which includes a spring-biased piston, and the piston includes a skirt with a plurality of apertures extending through the skirt. An O-ring is disposed about one end of the piston and the O-ring seats against a valve seat. The valve seat is simply a flat shoulder adjacent to a bore in which a portion of the piston extends. The bore comprises a guide for the movement of the piston. A spring biases the piston against the flow of fluid. Relatively low back pressure acts with the spring to urge the O-ring to seat against the shoulder to prevent fluid flow. However, since there is nothing to restrict the radially outwardly expansion of the O-ring, the O-ring may distort under sufficient back pressure and thus allow fluid to escape. The O-ring seal is not in a traditional O-ring seal environment and thus problems may occur.

SUMMARY OF THE INVENTION

The invention described and claimed herein comprises a check valve which includes a piston having a bore through the piston and a pair of guide portions extending in opposite directions from the piston. One of the guide portions, the first guide portion, includes a bore which communicates with the bore in the piston and through which fluid flows. A spring is disposed against the first guide portion to bias the piston to its closed position. Extending outwardly from the piston oppositely from the first guide portion and the closure spring is the second guide portion which includes a rod and a flange portion which extends into another bore and which acts as a guide for keeping the valve moving in a linear manner. The flange includes a plurality of openings through which fluid flows.

Among the objects of the present invention are the following:

To provide new and useful valve apparatus;

To provide new and useful check valve apparatus;

To provide new and useful spring-biased check valve apparatus;

To provide new and useful check valve apparatus having a fluid passage extending through the valve;

To provide new and useful valve apparatus utilizing back pressure to prevent fluid flow; and To provide new and useful check valve apparatus having a plurality of bores in which elements of the check valve extend and in which they move.

BRIEF DESCRIPTION OF THE DRAWING

FIG. 1 is a perspective view of the apparatus of the present invention.

FIG. 2 is an exploded perspective view of the apparatus of the present invention.

FIG. 3 is a view in partial section of the assembled apparatus of the present invention.

FIG. 4 is a view in partial section taken generally along line 4—4 of FIG. 3.

FIG. 5 is a view in partial section of the apparatus of the present invention illustrating the flow of fluid through the apparatus.

FIG. 6 is a view in partial section taken generally along line 6—6 of FIG. 5.

DESCRIPTION OF THE PREFERRED EMBODIMENT

FIG. 1 is a vertical perspective view of valve apparatus 10 of the present invention. The valve apparatus 10 includes two primary housing portions, an upstream valve housing portion 12 and a downstream valve housing portion 60. The two portions threadedly engage each other. An O-ring sealing element 50 is shown in FIG. 1 at the juncture of the housing portions 12 and 60.

The upstream valve housing 12 includes a cylindrical valve portion 14 and a cylindrical connector portion 16. The cylindrical valve portion 14 is of substantially larger diameter than the cylindrical connector portion 16. In FIG. 1, a wrench flat 20, one of a pair of parallel wrench flats, is shown on the cylindrical connector portion 16. The wrency flats 16 are for convenience in securing the valve apparatus 10 to an upstream conduit.

The cylindrical connector portion 16 includes a rear end face 18. A tapped bore 32 extends inwardly from the face 18 of the connector portion 16.

The downstream valve housing 60 includes a relatively large diameter cylindrical valve portion 64 and a relatively smaller diameter connector portion 66. The cylindrical valve portion 64 is disposed adjacent to the cylindrical valve portion 14 of the upstream valve housing 12. The O-ring seal 50 is disposed between the two housing portions 14 and 64.

The cylindrical connector portion 66 is of a substantially reduced diameter as compared to the diameter of the cylindrical portion 64. A wrench flat 70 is shown on the cylindrical connector portion 66. The wrench flat 70 is one of two parallel wrench flats on the connector portion 66 for convenience in securing the valve apparatus 10 to a downstream delivery conduit.

FIG. 2 is an exploded perspective view of the valve apparatus 10. The two valve housings 12 and 60 comprise two primary elements of the present apparatus. In FIG. 2, the two housing portions are shown spaced apart from each other, with a third primary element, a movable valve element 110, disposed between the two housing portions.

FIG. 3 is a view in partial section of the assembled valve apparatus 10 showing the valve 110 seated within the secured together housing portions 12 and 60. FIG. 5 is a view in partial section of the valve apparatus 10 showing the valve element 110 in its open position, allowing for the flow of fluid through the two valve housing portions. Thus, in FIG. 3, the valve apparatus 10 is shown in its closed position, and in FIG. 5 the valve apparatus 10 is shown in in its open position.

FIG. 4 is a view in partial section taken generally along line 4—4 of FIG. 3, through the valve housing 12, showing a portion of the valve 110 within a bore in the valve portion 14 of the housing 12.

FIG. 6 is a view in partial section taken generally along line 6—6 of FIG. 5, through a portion of the valve element 110. FIG. 6 illustrates the flow of fluid through the valve element 110.

For the following discussion, reference will primarily be made to FIGS. 1, 2, 3, and 5. Additional reference will also be made to FIGS. 4 and 6.

Within the upstream valve housing 12, and extending through both the cylindrical valve portion 14 and the cylindrical connector portion 16, is a longitudinally extending guide bore 30. The guide bore 30 communicates with the internally threaded bore portion 32. The two bore portions 30 and 32 are coaxially aligned, and thus the guide bore 30 is a continuation of the internally threaded bore 32.

At the front of the valve portion 14 of the housing 12 is a front face 40. Extending inwardly from the front face 40, and extending into the cylindrical valve portion 14, is a valve bore 36. The diameter of the valve bore 36 is substantially larger than that of the guide bore 30. The two bores communicate with each other. A shoulder 34 extends between the two bores 30 and 36.

A curved guide shoulder 38 extends between the valve bore 36 and the front face 40. The guide shoulder 38, which alternatively may be a chamfered portion, aids in guiding the valve element 110 into the valve bore 36. This will be discussed in more detail below.

Extending rearwardly from the front face 40 is an externally threaded portion 22. A shoulder 24 extends radially outwardly between the threaded portion 22 and an outer periphery 26 of the cylindrical portion 14 of the housing 12. The shoulder 24 is slightly curved to receive a sealing element 50, which may be an O-ring, to seal the two valve housing portions 12 and 60 together.

The valve housing 60 includes an end face 68 on the cylindrical connector portion 66. The wrench flats 70 extend generally parallel to each other and they extend axially from the end face 68.

At the front portion of the relatively large diameter cylindrical valve portion 64 of the housing 60 there is a conically tapered front face 72. The tapered front face 72 extends inwardly and rearwardly from the outer periphery of the cylindrical portion 64. The purpose of the taper of the face 72 is to insure that the O-ring sealing element 50 is appropriately biased against the shoulder 24 of the cylindrical portion 14 of the housing 12. This is best shown in FIGS. 3 and 5.

Within the downstream valve housing 60 are three bores, including a longitudinally extending guide bore 80, a spring bore 86, and a valve bore 90. The guide bore 80 is of the least diameter of the three bores within the downstream valve housing 60. It is disposed within the cylindrical connector portion 66. The guide bore 80 includes an internally threaded portion 82 which extends inwardly from the end face 68 of the cylindrical connector portion 66. The threaded portion 82 corresponds to the internally threaded portion 32 of the valve housing 12. It is used to help secure an appropriate conduit, such as a conduit 2, to the valve apparatus 10. The conduit 2 includes an externally threaded portion which matingly engages the internally threaded portion 82 to secure the conduit 2 to the valve apparatus 10.

A radially extending shoulder 84 extends between the guide bore 80 and the spring bore 86. As illustrated in FIGS. 3 and 5, the spring bore 86 is of a relatively short axial length, and its diameter is slightly greater than that of the guide bore 80. The bores 80, 86, and 90 are coaxially aligned. The bores 80, 86, and 90 are also coaxially aligned with the bores 30 and 36.

Between the spring bore 86 and the valve bore 90 is a radially extending shoulder 88. The diameter of the valve bore 90 is substantially greater than the diameters of the guide bore 80 and the spring bore 86. Moreover, the diameter of the valve bore 90 is greater than the diameter of the valve bore 36 of the housing portion 12. A portion of the valve element 110 moves in the valve bores 36 and 90. This is again best shown in FIGS. 3 and 5.

Communicating with the valve bore 90, and comprising an extension thereof, is an internally threaded bore portion 92. The internally threaded bore portion 92 extends from the bore 90 to the tapered face 72. The internally threaded portion 92 matingly engages the externally threaded portion 22 of the cylindrical valve portion 14 to secure the two housing portions 12 and 60 together. The O-ring sealing element 50 is disposed between the two housing portions to insure that no fluid leaks from the housing portions.

The valve element 110 includes a valve body or piston 112, the outer diameter of which is slightly less than the inner diameter of the valve bore 36. The outer diameter of the valve body or piston 112 is substantially less than that of the bore 90.

The valve element 110 includes a front face 114 which is substantially perpendicular to the longitudinal axis of the cylindrical valve body or piston 112. An O-ring groove 118 extends circumferentially about the periphery of the valve body 112 adjacent to the front face 114, and an O-ring sealing element 120 is disposed in the groove 118. The O-ring 120 comprises a sealing element to seal the piston or valve body 112 with respect to the bore 36, and accordingly prevents the flow of fluid between the bore 36 and the bore 90 when the valve body 112 is disposed within the bore 36.

Downstream from the O-ring groove 118 is a diametrically extending passage 122. The passage 122 extends diametrically through the valve body or piston 112 and provides for the flow of fluid through the piston. The piston 112 includes a rear face 124 generally parallel to and remote from the front face 114. A guide tube 126 extends rearwardly from the rear face 124 of the piston or valve body 112. The guide tube 126 is disposed within the guide bore 80. The guide tube 126 remains in the bore 80 as the valve element 110 moves within the valve portions 14 and 64 of the housing portions 12 and 60, respectively.

A bore 128 extends longitudinally through the guide tube 126 and into the piston 112 to the diametrically extending passage or bore 122. The bores 122 and 128 thus communicate with each other to provide or define a fluid passage through the valve element 110.

A compression spring 130 is disposed about the guide tube 126 and extends between the rear face 124 of the piston 112 and the shoulder 84 of the housing 60. The shoulder 84, between the spring bore 86 and the guide bore 80, comprises a fixed wall for the spring 130. The spring 130 is disposed within the spring bore 86 and biases the valve element 110 in the valve bore 36 so that the front face 114 of the piston 112 is disposed against the shoulder or face 34.

Extending outwardly from the front face 114 is a guide rod 140. At the distal end of the guide rod 140, remote from the front face 114, is a radially outwardly extending flange 142. The flange 142 is circular in configuration, with a plurality of cutout portions or recesses 144 to allow for the flow of fluid through the flange 142. The flange 142 remains in the bore 30 to help the piston 112 to move axially within the housings 12 and 60.

The flange 142 is best shown in FIG. 4. FIG. 4 comprises a view in partial section through a portion of the cylindrical housing portion 14, and through the bore 30, and looking at the end of the flange 142. The guide rod 140 is shown in dotted line in FIG. 4. The cutouts or recesses 144 and the flange 142 are shown in substantial detail. There are three cutout portions 144 illustrated in FIG. 4. Accordingly, fluid flows through the bore 30, past the flange 142, by way of the recesses or cutouts 144, and to the front face 114 of the valve body or piston 112 of the valve element 110. The overall diameter of the flange 142 is slightly less than the diameter of the bore 30, and accordingly the flange moves easily in the bore 30.

In operation, as positive pressure is applied in the upstream valve housing 12 through the bore 30, the valve element 110 moves the valve body or piston 112 out of the bore 36 when the force of the hydraulic fluid overcomes any back pressure acting on the rear face 124 of the piston 112 and the pressure or force of the spring 130. When the O-ring sealing element 120 moves out of the bore 36, and into the bore 90, fluid flow from the upstream bore 30 flows radially through the passage 122 and into and through the communicating bore 128. The hydraulic fluid flows through the bore 128 and into the bore 80 and on into the conduit 2. The fluid then flows to a delivery nozzle, etc., as desired.

During the movement of the valve element 110, the guide flange 142 remains within the bore 30, and the flange 142 maintains the rod 140 relatively centrally with respect to the bore 30. The flange 142 and rod 140 help to maintain the valve body or piston 112 moving in a linear manner within the bores 36 and 90. Similarly, the guide tube 126 remains partially within the bore 80 to similarly help maintain the linear movement of the valve body or piston 112 within the bores 36 and 90. With guide elements on either side of the piston 112, the valve 110 is restricted to rather linear movement in its two directions of travel.

The maximum linear movement of the valve element 110 occurs when the rear face 124 of the valve body or piston 112 is disposed against the shoulder or face 88 within the downstream valve housing 60.

When the upstream pressure diminishes, or is reduced below the force of the compression spring 130, the compression spring 130 biases the valve body or piston 112 forwardly, so that it moves from the bore 90 into the bore 36. As indicated above, the chamfer or curved guide shoulder 38 helps to guide the valve body or piston 112, with its O-ring 118, into the bore 36. When the piston or valve body 112 moves into the bore 36, with the O-ring 120 sealingly engaging the bore 36, fluid flow is prevented between the bores 30 and 36 to the bore 90, and accordingly no fluid flows through the passage 122 and into the bore 128. The O-ring 120 thus assures that there will be no leakage past the piston 112 so that there is a positive cessation of flow.

The flange 142 and the guide tube 126 assure that there will be a smooth linear flow of the valve body or piston 112 with respect to the bores 90 and 36.

The valve element 110 is in its full closed position when the front face 114 is disposed against the shoulder or face 34 of the cylindrical valve portion 14.

It will be noted that any back pressure on the valve apparatus 10 merely helps to insure that a sealing relationship is maintained between the valve body or piston 112 and its O-ring 120 and the valve housing 12. The O-ring 120 is maintained in its natural environment to help insure the good sealing relationship between the valve body or piston 112 and the bore 36 of the housing portion 12. The O-ring 120 cannot distort out of its environment, and a good seal is thus insured. Thus, any reverse pressure or back pressure of the working fluid acting against the front face 114 of the valve body or piston 112, or pressure in excess of a back pressure plus the force exerted by the compression spring 130, causes the valve 112 to move out of the bore 36 and into the bore 90, and thus the working fluid flows through diametrically extending passageway or bore 122 and into the communicating longitudinally extending bore 128 of the guide tube 126 to allow fluid to flow through the valve apparatus 10 and on out through the conduit 2.

It will also be noted that the valve element 110 is substantially friction free when the sealing O-ring 120 clears the bore 36. The only friction of the valve is then caused by the nominal friction of the guide tube 126 and the guide flange 142 in their respective bores 80 and 30. Essentially, the bias of the spring 130 is the only force that the working fluid pressure and the piston 112 of the valve element 110 must contend with.

However, once the O-ring 120 reaches the bore 36, there is no further communication between the bores 36 and 90, and no fluid flows. The sealing occurs almost instantaneously as the O-ring 120 contacts the bore 36. The curved shoulder or chamfer 38 aids in guiding the O-ring 120 and the piston 112 into the bore 36. The O-ring 120 thus extends into the bore 36 by way of a reducing diameter area to help center and guide the O-ring and the piston 112.

While the principles of the invention have been made clear in illustrative embodiments, there will be immediately obvious to those skilled in the art many modifications of structure, arrangements, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Valve apparatus for a fluid, comprising, in combination:
   first housing means;
   first bore means in the first housing means, including
      a first valve bore having a first diameter,
      a first guide bore communicating with the first valve bore through which fluid flows to the first valve, and
      a first shoulder between the first valve bore and the first guide bore;
   second housing means secured to the first housing means;
   second bore means in the second housing means, including
      a second valve bore communicating with the first valve bore and having a second diameter which is greater than the first diameter of the first valve bore,
      a spring bore communicating with the second valve bore, and
      a second guide bore communicating with the spring bore; and valve means movable in the first and second housing means, including
      a valve element movable in the first and second valve bores between a closed position in the first valve bore and an open position in the second valve bore,
      a first face on the valve element against which fluid pressure may bear to urge the valve element to the open position and which, when disposed on the first shoulder, defines a fully closed position,
      a guide rod secured to the first face and extending into the first guide bore for guiding the valve element as the valve element moves in the first and second valve bores,
      a second face on the valve element against which fluid back pressure may bear to urge the valve element to its closed position in the first valve bore,
      a guide tube secured to the second face and extending into the second guide bore for guiding the valve element as it moves in the first and second valve bores,
      a fluid bore in the guide tube through which fluid flows,
      spring means disposed about the guide tube and extending into the spring bore and between the second face and the spring bore for urging the valve element to its off position in the first valve bore,
      passage means extending through the valve element and communicating with the fluid bore through which fluid flows to the fluid bore when the valve element is at least partially out of the first valve bore and into the second valve bore, and
      sealing means extending circumferentially about the valve element between the first face and the passage means for sealing the valve element when the sealing means and the adjacent portion of the valve element is disposed in the first valve bore to prevent the flow of fluid from the first and second valve bores into the passage means and the fluid bore.

2. The apparatus of claim 1 in which the first housing means includes guide means for guiding the valve element and the sealing means into the first valve bore.

3. The apparatus of claim 1 in which the valve means further includes a guide flange secured to the guide rod and disposed in the first guide bore for guiding the guide rod and the valve element as the valve element moves in the first and second valve bores.

4. The apparatus of claim 3 in which the guide flange of the valve means includes cutout means through which fluid flows in the first guide bore.

5. The apparatus of claim 4 in which the cutout means includes a plurality of cutouts spaced apart from each other through which fluid flows in the first guide bore.

6. The apparatus of claim 1 in which the passage means comprises a diametrically extending passage through the valve element, and the fluid bore intersects the diametrically extending passage to provide communication for the flow of fluid from the passage to the fluid bore.

7. The apparatus of claim 1 in which the second housing means includes a second shoulder between the spring bore and the second valve bore, and the second face of the valve element is disposed against the second shoulder to define a fully opened position.

* * * * *